March 21, 1950 — W. F. BLAKE — 2,501,256
SOAP DISH
Filed Jan. 7, 1947

Inventor:
William F. Blake
By John W. Darley
Attorney.

Patented Mar. 21, 1950

2,501,256

UNITED STATES PATENT OFFICE 2,501,256

SOAP DISH

William F. Blake, Chicago, Ill.

Application January 7, 1947, Serial No. 720,583

2 Claims. (Cl. 45—28)

My invention relates to dishes for holding soap in cake form and more particularly to a receptacle of this type which is designed to insure adequate and complete drainage of water from the cake or bar with a minimum loss of soap content.

In the characteristic form of soap dish, the cake either lies flat on the bottom of the dish or it may rest on shallow ribs or protuberances that project upwardly from the bottom. In the former case, the cake is partly submerged for an indefinite period in a pool of water created by drainage from the cake, causing loss of soap and the formation of a soft mass on the surface of the cake that is in contact with the water. This mass washes away quickly when the cake is again used, i. e., more rapidly than an equivalent amount of the soap proper so that further loss of soap occurs. Where the cake is supported by ribs or a comparable element, depressions are formed in the surface of the cake due to its being wet which also results in loss of the soap material. Moreover, these ribs may be so shallow that the cake lies in the drainage water with the results noted above, or if deep enough to prevent this condition, sufficient water may adhere to the under side of the cake by reason of its horizontal position to create the mushy layer to which reference has already been made.

I have determined that wastage of the soap material can be restricted to that occurring during use of the cake if the latter can be properly drained and its contact with the dish or other cakes therein reduced to a minimum. Water clings to the areas of such contacts by adhesion tension and softens the soap. It is also important to insure complete and rapid aeration of the dish so that drainage water will quickly evaporate and to support the cakes in positions definitely clear of any water deposits temporarily resting in the dish.

It is therefore one object of my invention to provide a dish which is so constructed and arranged that having regard for the normally haphazard manner in which a soap cake is dropped in the dish, the cake will take a position that insures adequate drainage and a minimum surface contact with the wall of the dish and other cakes if present.

A further object is to provide a dish which is capable of holding several cakes of varying shapes and sizes while retaining the characteristics already noted.

A further object is to provide a circular dish which is shaped and arranged to present convex and stepped vertical walls to opposite sides of a cake, or one side of a cake depending upon the number of cakes in the dish, thus insuring a minimum area contact with the cake and preventing the formation of water collecting pockets that would be created by simple, concave walls and the part of the cake included thereby.

A further object is to provide a dish in which the cakes are supported well above the bottom of the dish and which is arranged to secure complete aeration of the bottom of the dish and consequent rapid evaporation of any water that may collect in the bottom.

These and further objects of the invention will be set forth in the following specification, reference being had to the accompanying drawing, and the novel means by which said objects are effectuated will be definitely pointed out in the claims.

In the drawing.

Figure 1:
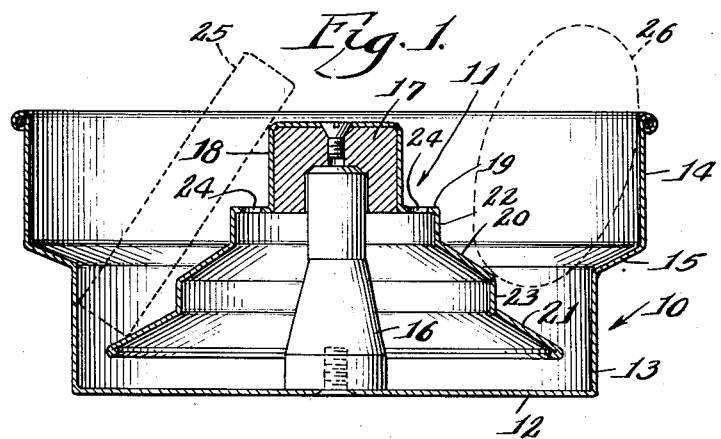
Fig. 1 is a sectional elevation of the dish taken along the line 1—1 in Fig. 2 and showing in dotted outline characteristic positions assumed by soap cakes.
Figure 2:
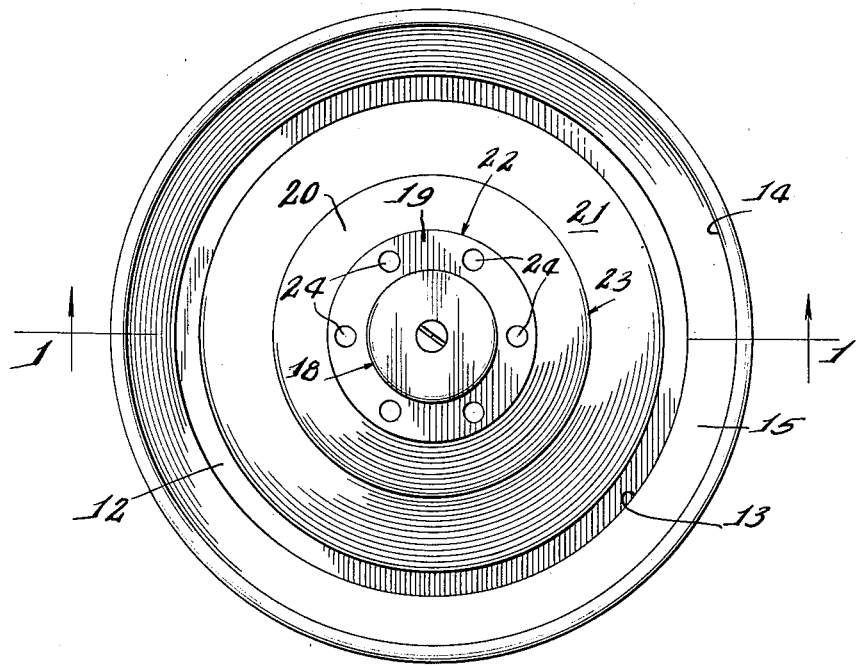
Fig. 2 is a top, plan view of the dish.

Referring to the drawing, the dish comprises an open top, cylindrical cup 10 and a generally frusto-conical, soap supporting shell 11 which is coaxial with the cup. Specifically, the cup 10 is formed with a bottom wall 12 and an annular, stepped wall comprising a lower, vertical portion 13, an upper, vertical portion 14 having a larger diameter than the portion 13, and a connecting shelf-like portion 15 which inclines towards the wall 12.

Coaxial with the cup 10 and extending upwardly from and secured to the bottom wall 12 is a post 16 and embracing the upper end of the post is a cap 17 which fits within and is secured to an inverted, cup-shaped portion 18 that constitutes the upper part of the shell 11. Depending from the lower end of the portion 18 is an outwardly flaring, preferably stepped, continuous skirt comprising an upper and annular, horizontal wall 19 and intermediate and lower, inclined walls 20 and 21, respectively, with an annular, vertical wall 22 connecting the adjacent ends of the walls 19 and 20 and a similar, vertical wall 23 connecting the adjacent ends of the walls 20 and 21. The lower edge of the wall 21 is preferably spaced not more than one-quarter of an inch from the cup wall 13 so that the shell 11 may freely drain to the bottom of the cup 10 and so that the shell 11 will continue to support a cake of soap until it has been reduced to a non-usable size. Further, the lower edge of the wall 21 is spaced a convenient distance above the bottom wall 12 such that it is always clear of any drainage water in the cup. The mounting of the shell 11 on the post 16 provides a non-tiltable and stable support for the shell so that the latter always maintains the same relation to the surrounding wall of the cup 10 and so that the shell may be easily lifted for cleaning and to provide cleaning access to the interior of the cup.

A troublesome problem with dishes of this character, i. e., those having a solid, bottom wall as distinguished from those which are perforated to drain into another receptacle, such as a wash basin or stand, is the rapid evaporation of drainage water. The handling of this problem is particularly important where the soap is used frequently because unless the dish is made objectionably deep, parts of the soap cakes may be immersed in the drainage water after a period of use with consequent loss of soap content.

In the present instance, this consideration is effectively dealt with by providing adequate aeration of the bottom of the cup 10. As already noted, the lower edge of the wall 21 is spaced from the cup walls 12 and 13 so that the air has free access to the bottom of the cup and the circulating path is completed by providing a plurality of spaced apertures 24 in the wall 19, or at the highest part of the interior of the shell. These apertures are spaced from the post 16 and it will also be obvious that the skirt comprising the walls 19, 20, 21, 22 and 23 is also well spaced from the post so that any water which collects in the bottom of the cup 10 is continuously subjected to the evaporating action of a freely moving current of air.

Typical positions assumed by two different shapes and sizes of cakes are indicated by the numerals 25 and 26 (see Fig. 1). It will be noted that due to the shapes and relation of the cup 10 and shell 11, each cake will assume a position which insures free drainage of water along the walls of the cup and shell to the bottom of the cup, this position ordinarily being a generally upright one and with the lower ends of the cakes being disposed well above the bottom of the cup and clear of any drainage water that is continuously subjected to aeration. Moreover, the cakes have only limited contact with the cup and shell, regardless of the positions assumed, thus preventing any substantial amount of water adhering to the soap at the areas of contact and accordingly decreasing soap wastage due to softening of the cake in these localities.

These results are specifically insured by the stepped construction of the annular wall of the cup 10, the major portions of this wall being vertical, the similar shaping of the skirt portion of the shell 11, and the shape of the annular, cake receiving pocket defined by the shell 11 and the surrounding wall of the cup 10, any diametral section of the pocket being generally V-shaped. The circular shape of the shell 11 insures that any area thereof which is contacted by a soap cake will be convex in general formation so that there will not be any opportunity for the shell to create water collecting pockets with the surface of the cake contacted thereby.

I claim:

1. A dish for holding soap in cake form comprising an open top, cylindrical cup having an annular side wall including upper and lower portions laterally offset with respect to each other and connected by an annular step portion inclined inwardly of the cup, the junction of the step and lower portions defining an annular edge positioned inwardly of the upper portion, and a conical shell mounted coaxially within the cup and in spaced relation to the side wall thereof, the lateral wall of the shell being formed with a succession of annular steps forming annular projections terminating outwardly of the shell in a plurality of vertically spaced, annular edges concentric with the annular edge on the cup wall, the lowermost run portions of the shell steps being inclined towards the cup side wall for drainage, those parts of the soap cake which touch the cup and shell being in substantially tangential relation thereto.

2. A dish for holding soap in cake form comprising an open top, cylindrical cup having an annular side wall including upper and lower portions laterally offset with respect to each other and connected by an annular step portion, the junction of the step and lower portions defining an annular edge positioned inwardly of the upper portion, a post coaxial with the cup and extending upwards from the bottom thereof, and a conical shell supported on the post in coaxial and spaced relation to the side wall of the cup with the lower edge of the shell spaced above the bottom of the cup, the lateral wall of the shell being formed with a succession of annular steps forming annular projections terminating outwardly of the shell in a plurality of vertically spaced, annular edges concentric with the annular edge on the cup side wall, those parts of the soap cake which touch the cup and shell being in substantially tangential relation thereto.

WILLIAM F. BLAKE.

REFERENCES CITED

The following references are of record in the file of this patent:

UNITED STATES PATENTS

| Number | Name | Date |
|---|---|---|
| 872,894 | Burn | Dec. 3, 1907 |
| 1,380,288 | Cheak | May 31, 1921 |
| 1,404,730 | Bandy | Jan. 31, 1922 |
| 2,325,293 | Wolf | July 27, 1943 |
| 2,359,797 | Schnider | Oct. 10, 1944 |